(12) United States Patent
Bergstrom et al.

(10) Patent No.: US 6,736,232 B1
(45) Date of Patent: May 18, 2004

(54) FRONT AXLE ARRANGEMENT FOR A HEAVY VEHICLE

(75) Inventors: Ake Bergstrom, Mariefred (SE); Pär Wallin, Järna (SE); Michael Linden, Södertälje (SE); Fredrik Modahl, Norsborg (SE); Anders Gustavsson, Gnesta (SE); Geoffrey Davidson, Göteborg (SE)

(73) Assignee: Scania CV AB (Publ) (SE)

( * ) Notice: Subject to any disclaimer, the term of this patent is extended or adjusted under 35 U.S.C. 154(b) by 0 days.

(21) Appl. No.: 10/089,637
(22) PCT Filed: Sep. 28, 2000
(86) PCT No.: PCT/SE00/01873
§ 371 (c)(1),
(2), (4) Date: Aug. 7, 2002
(87) PCT Pub. No.: WO01/23245
PCT Pub. Date: Apr. 5, 2001

(30) Foreign Application Priority Data

Sep. 29, 1999 (SE) .................................................. 9903519

(51) Int. Cl.⁷ ........................... B60K 1/00; B60K 7/00; B62D 21/15; B60J 7/00
(52) U.S. Cl. ....................... 180/292; 180/312; 280/781; 296/204
(58) Field of Search ........................... 301/124.1, 125; 180/292, 291, 311, 312, 299, 89.16, 89.19; 280/785, 800, 124, 109, 781, 797; 296/193.07

(56) References Cited

U.S. PATENT DOCUMENTS

| | | | | | |
|---|---|---|---|---|---|
| 3,279,816 A | * | 10/1966 | Issogonis | ..................... | 280/792 |
| 3,309,943 A | * | 3/1967 | Kosman et al. | ............. | 475/200 |
| 3,913,696 A | * | 10/1975 | Kennedy et al. | ............ | 180/312 |
| 4,040,640 A | | 8/1977 | Begg | ...................... | 280/106 R |
| 4,593,786 A | * | 6/1986 | Tate | ........................... | 180/291 |
| 4,881,756 A | * | 11/1989 | Kumasaka et al. | ......... | 280/785 |
| 6,003,935 A | * | 12/1999 | Kalazny | ..................... | 296/204 |
| 6,193,274 B1 | * | 2/2001 | Brown et al. | ............... | 280/784 |
| 6,428,046 B1 | * | 8/2002 | Kocer et al. | ................ | 280/781 |

* cited by examiner

*Primary Examiner*—Stephen Avila
*Assistant Examiner*—Jason R. Bellinger
(74) *Attorney, Agent, or Firm*—Ostrolenk, Faber, Gerb & Soffen, LLP

(57) ABSTRACT

The invention relates to a front axle arrangement for a heavy vehicle, e.g. a freight vehicle. The vehicle incorporates a number of wheels (42, 43) which bear the vehicle, and an engine unit (20) for the vehicle's propulsion and a longitudinal chassis element (6) which extends along the vehicle's longitudinal axis in the normal direction of forward movement of the vehicle. The front axle arrangement forms a separate front axle unit (11) incorporating a frame structure (12–15) which is intended to be connected to the longitudinal chassis element, and two of said wheels which are suspended in the frame structure. The front axle unit (11) is intended to bear the engine unit (20) in such a way that the latter extends in through a central aperture of the frame structure (12–15) and can at least partially be extracted from the front axle unit.

19 Claims, 4 Drawing Sheets

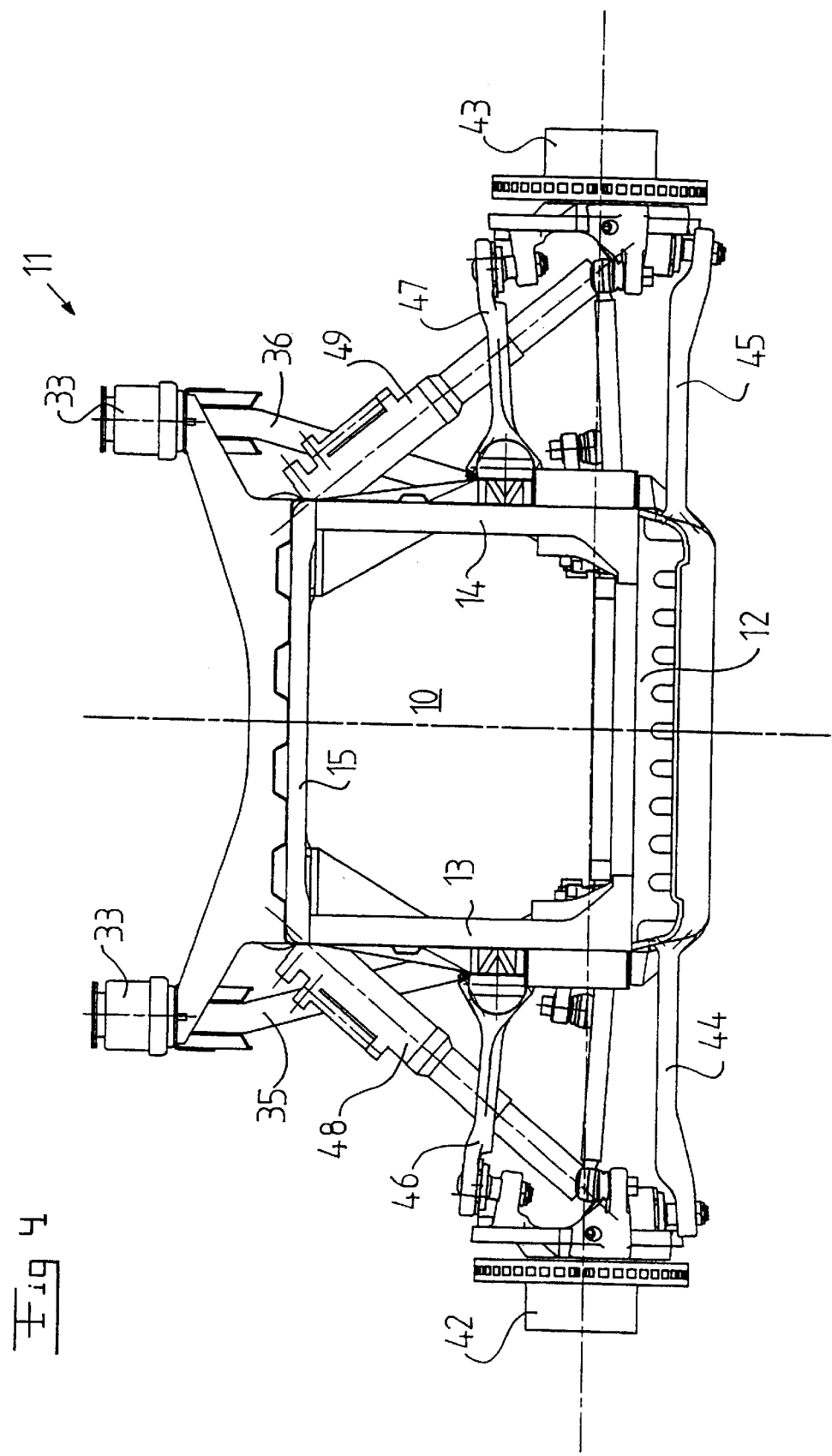

FRONT AXLE ARRANGEMENT FOR A HEAVY VEHICLE

BACKGROUND TO THE INVENTION, AND STATE OF THE ART

The present invention relates to a front axle arrangement for a heavy vehicle and its cooperation with the vehicle chassis and also with the vehicle engine.

Heavy vehicles, which here means, for example, trucks, buses and similar freight and utility vehicles, incorporate according to conventional technology a longitudinal chassis element in the form of two frame side members which are connected to one another by means of a number of cross-members. The frame side members extend parallel with one another along substantially the whole length of the vehicle and support vehicle components such as the engine, the driver's cab and a load surface which takes the form of, for example, a load platform or a superstructure. In addition, the vehicle's front and rear axles are suspended in the frame side members.

In heavy vehicles such as trucks, the frame side members and the cross-members act as the main loadbearing parts of the vehicle in order to provide strength and rigidity. In heavy vehicles such as buses, the bodywork also contributes to vehicle rigidity and strength. Conventionally designed support devices are nevertheless built so as to be relatively unresistant to bending and torsion in order to be able to cope with heavy loads and varying road conditions, comprising a complete range from forest roads or no roads to smooth motorways. Relatively low resistance to bending and torsion does entail, however, certain problems with regard to riding comfort and vehicle running characteristics. The chassis element having relatively low resistance to torsion and the wheel axles being made of steel result in not entirely satisfactory riding comfort, particularly on long journeys and on good roads. Nor is it possible for riding comfort and vehicle running characteristics to be improved to any appreciable extent by more sophisticated suspension systems. As heavy vehicles are to an ever increasing extent travelling on smooth roads, riding comfort and vehicle running characteristics are an increasingly important factor. In addition to riding comfort being naturally advantageous for the vehicle's driver and passengers, it is also important to reduce the amount of damage to freight, particularly when carrying goods which are easily damaged. Conventional frame side members and steel wheel axles result in any road surface unevenness being propagated in the support device and having adverse effects on substantially the whole vehicle.

The conventional superstructure of a heavy vehicle also has the disadvantage of its manufacture being relatively expensive because such a design involves many different components which cannot be standardised for different vehicle variants. For example, the vehicle's front and rear axle arrangements may involve many different components depending on whether the respective wheels are to be steerable or not, powered or not, how many rear axles the vehicle is to have, the type of suspension, etc. Such a conventionally constructed heavy vehicle also requires a relatively large amount of assembly work.

DE-A-4322716 describes a vehicle chassis for heavy-duty vehicles. The chassis incorporates a rear axle arrangement, a box-like central chassis element and a front axle arrangement. The rear and front axle arrangements are of conventional design in that they incorporate two longitudinal frame members which are connected to one another by means of cross-members. The wheel suspension seems to incorporate a steel wheel axle and the forces acting upon the wheels will be led on into the central box-like chassis element.

SUMMARY OF THE INVENTION

The object of the present invention is to eliminate the abovementioned problem. What is particularly intended is a front axle arrangement which contributes to a more comfortable ride and better running characteristics. It is also desirable that it be possible for the front axle arrangement to be made of components which are largely standardised and are easy to assemble.

This object is achieved with the front axle arrangement indicated in the introduction which has a frame with a box-like structure in cross section across the vehicle axis. The frame is separably received at the vehicle chassis and it also receives and separably supports the engine unit.

Such a front axle unit incorporating a box-like frame structure which supports vital components of the vehicle in the region of the front axle makes it possible to create a unit which forms a front axle module which can be used for many different vehicle variants. The box-like structure also means that the front axle unit according to the invention is so constructed as to be, in all essentials, self-supporting and designed to absorb at least substantially all the vertical forces which act upon the front wheels.

According to one embodiment of the invention, the engine unit is arranged in the front axle unit in such a way as to be at least partially extractable from it. This makes it possible for the engine unit to take the form of a uniform module which can be used for many different vehicle variants. The engine unit being extractable from the front axle module renders the engine readily accessible for maintenance and servicing without having, as with previous technology, to tilt the vehicle's cab.

In accordance with a further embodiment of the invention, the frame structure as viewed in the direction of the longitudinal axis has a central aperture. This means that the engine unit can with advantage extend in through the central aperture. In this way the engine, which is of considerable weight, will be situated over an imaginary rear wheel shaft, which is a favourable situation from the load distribution point of view. The frame structure as viewed in the direction of the longitudinal axis forms with advantage a substantially closed ring round the central aperture and has a substantially quadrilateral shape. Such a ringlike configuration enables the frame structure to absorb substantially all the vertical forces which act upon the front wheels. Such a frame structure is of great rigidity and strength In addition, the chassis element, as viewed in the direction of the longitudinal axis, may also have a substantially quadrilateral shape, while the frame structure has an outer contour which in all essentials corresponds to an inner contour of the chassis element. Such a quadrilateral box-like chassis element has a relatively high resistance to torsion. At the same time, the quadrilateral frame structure is easy to fasten in such a chassis element and the chassis element's resulting torsional rigidity can also be maintained with respect to the front axle unit.

According to a further embodiment of the invention, the frame structure incorporates a substantially horizontal lower portion. In addition, the frame structure may incorporate two side portions which extend upwards from the lower portion, and an upper portion which extends between, and connects, the two side portions. The result is a substantially quadrilateral closed ring configuration.

According to a further embodiment of the invention, said two wheels are individually suspended in the frame structure. This improves the vehicle's riding comfort and running characteristics in that vertical forces acting upon a front wheel of the vehicle will be absorbed by the frame structure and will not act upon other parts of the vehicle. This means that each of said two wheels can be suspended by means of a lower link arm and an upper link arm which are pivotingly connected to the frame structure. With advantage, the lower link arms are pivotingly connected to the lower portion and each of the upper link arms to a respective side portion. In addition, the front axle unit may incorporate a spring device for each wheel, each spring device being connected to the upper portion and a respective lower link arm.

According to a further embodiment of the invention, the front axle unit is designed to carry a driver's cab of the vehicle. This enables the driver's cab to rest on substantially fixed support elements of the frame structure, resulting in stable mounting of the driver's cab on the substantially self-supporting front axle unit.

According to a further embodiment of the invention, the drive unit includes the vehicle's engine, the engine's radiator core and two support members which extend substantially parallel with the vehicle's longitudinal axis and on which the engine and the radiator core are mounted, the radiator core being situated in front of the engine in the direction of forward movement. Such an embodiment substantially facilitates maintenance and servicing in that the engine and radiator core can be extracted from the front axle unit in the form of a single joint unit, i.e. the engine's cooling circuit can remain intact during normal maintenance work. At the same time, said support members are at least partially intended to rest on the lower portion when the engine unit is in place in the front axle unit and to support the engine and the radiator core when the engine unit is extracted from the front axle unit.

According to a further embodiment of the invention, the engine unit is intended to be connected via a driveshaft to a gearbox which is situated at a distance from the engine unit and adjacent to powered rear wheels of the vehicle. This provides the vehicle with a favourable weight distribution.

BRIEF DESCRIPTION OF THE DRAWINGS

The present invention will now be explained by describing a preferred embodiment with reference to the attached drawings.

FIG. 4 shows a view from above of the front axle arrangement's front axle unit.

DETAILED DESCRIPTION OF AN EMBODIMENT OF THE INVENTION

Figure 1:
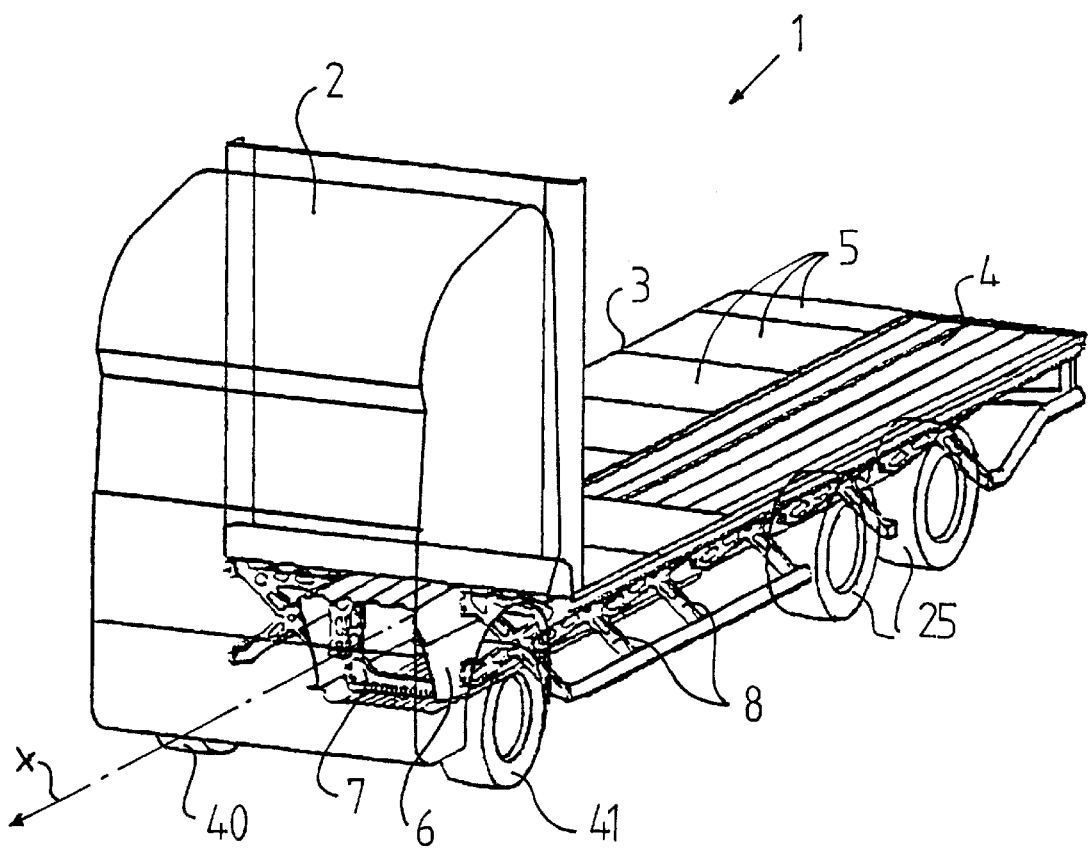
FIG. 1 shows a perspective view of a heavy vehicle.

FIG. 1 depicts schematically a heavy vehicle 1 with a driver's cab 2 and a load surface 3 which consists of a corrugated metal sheet 4 and panels 5 arranged on the metal sheet 4. FIG. 1 depicts a heavy vehicle in the form of a truck but it should be noted that the invention is also applicable to other types of heavy vehicle, e.g. buses.

The vehicle 1 incorporates a chassis element 6 which extends substantially parallel with the vehicle's longitudinal axis x in the vehicle's normal direction of forward movement. As indicated in FIG. 1, the chassis element 6 has a box-like shape and is substantially quadrilateral as viewed in the direction of the longitudinal axis x. The chassis element 6 is made of relatively thin sheetmetal. The chassis element 6 also incorporates a number of support frames 7 which have a central aperture and are distributed along the length of the chassis element 6. FIG. 1 shows only one such support frame 7. On each side of the chassis element 6, outside each support frame 7, there is a support device 8 which is connected to the support frame 7 by bolts running through (not depicted). The corrugated metal sheet 4 and the panels 5 which form the load surface 3 thus rest on the chassis element 6 and the support devices 8.

Figure 2:
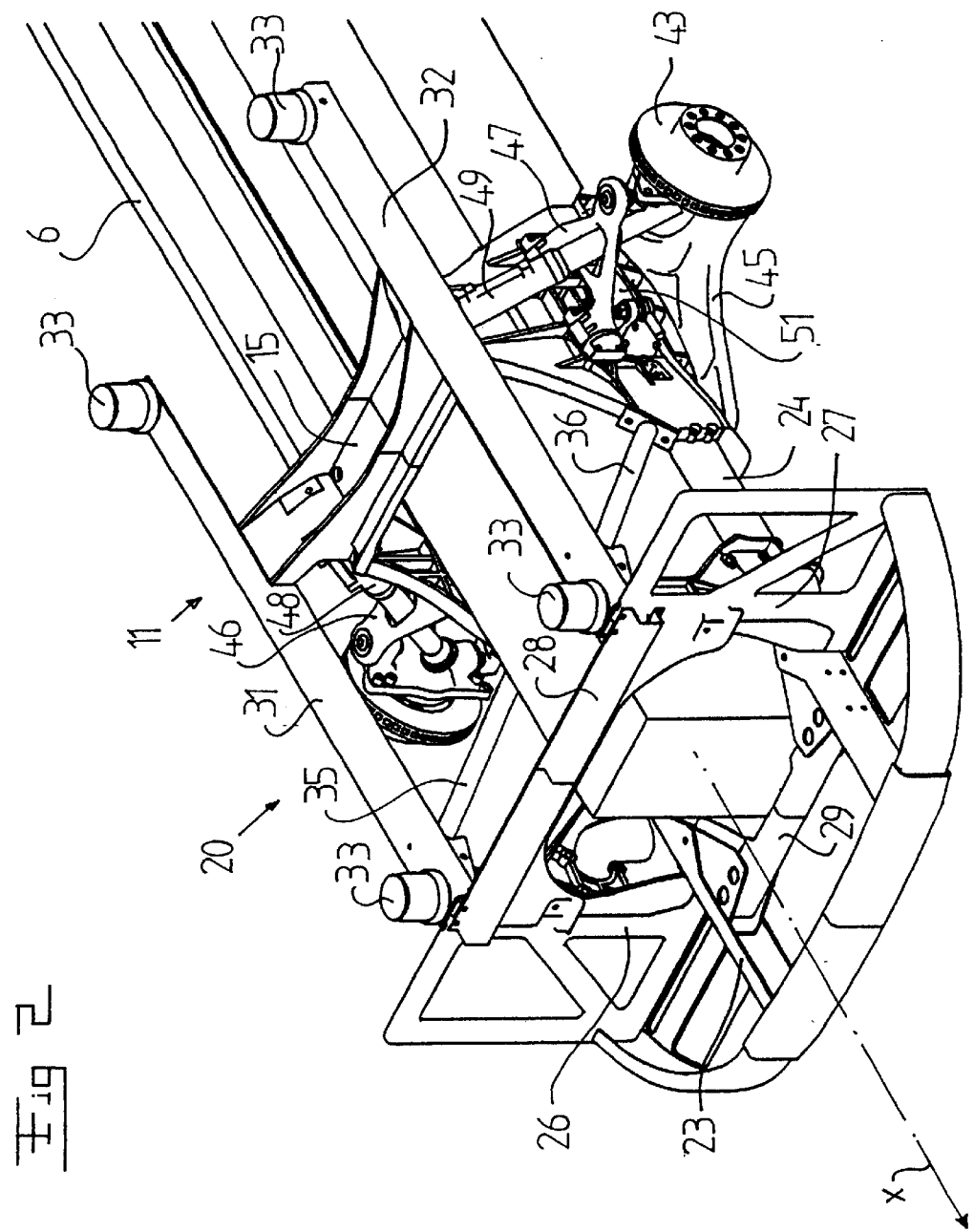
FIG. 2 shows a perspective view of a front axle arrangement according to the invention, but with the vehicle's engine and radiator core omitted for the sake of clarity.
Figure 3:
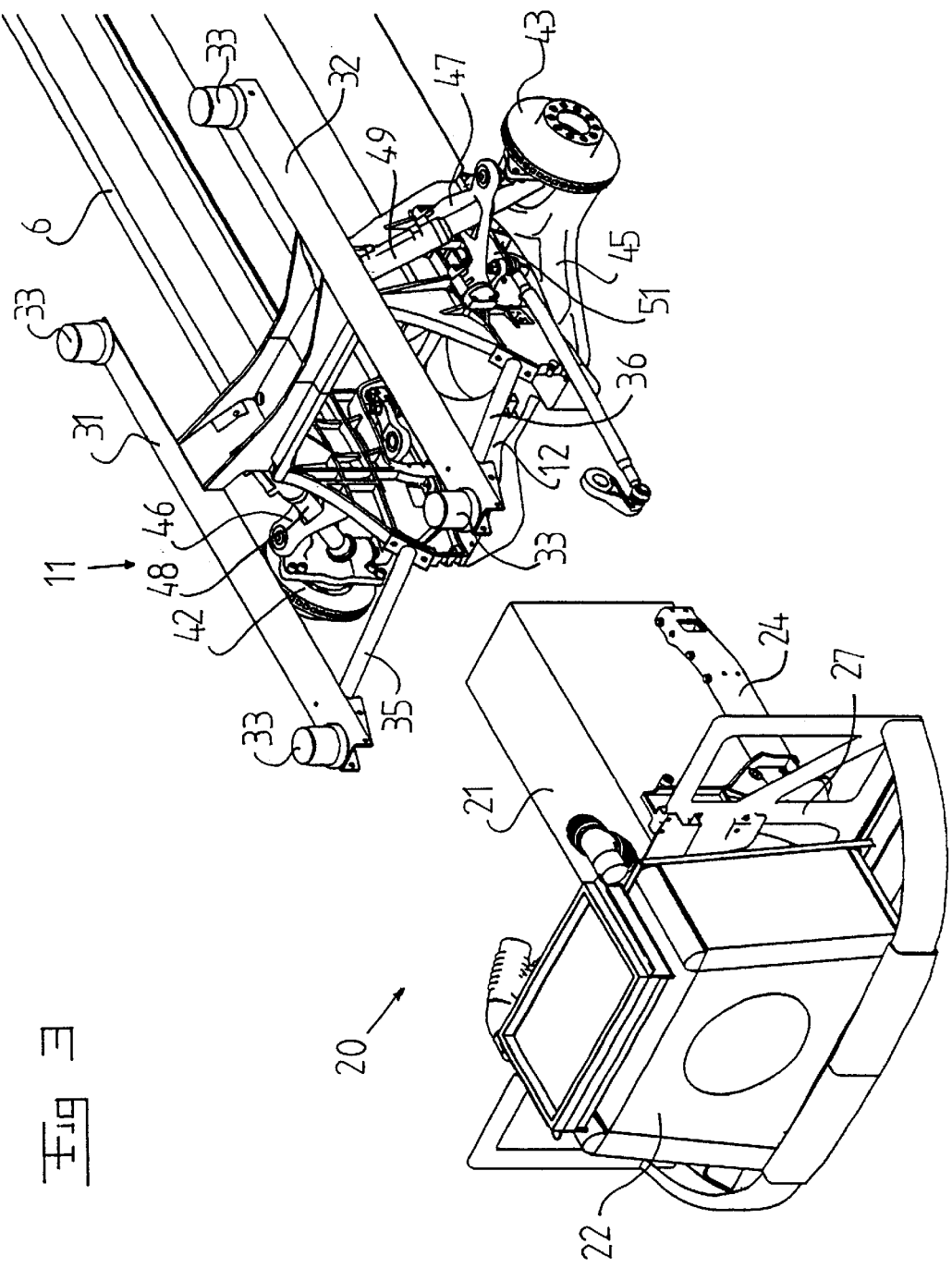
FIG. 3 shows a perspective view of the front axle arrangement's front axle unit and the engine unit extracted from the front axle unit.

The present invention relates to the front axle arrangement of the vehicle 1 which is depicted in FIGS. 2, 3 and 4 but not in FIG. 1. The front axle arrangement is intended to be connected to the chassis element 6 in a manner explained in more detail below.

As most clearly indicated in FIGS. 3 and 4, the front axle arrangement forms a front axle unit 11 which incorporates a frame structure with a box-shaped structure or shape. The box-shaped frame structure has, as viewed in the direction of the longitudinal axis x, a central aperture or a space 10 and forms a substantially closed ring round the central aperture or the space 10. The ring has a substantially quadrilateral rectangular shape. The frame structure incorporate four essential basic elements, namely a substantially horizontal lower portion 12, two side portions 13,14 which extend upwards, substantially vertically, from the lower portion 12, and a substantially horizontal upper portion 15 which extends between and connects the two side portions 13 and 14 to one another. These four basic elements 12–15 thus form the box-like substantially quadrilateral frame structure. The four basic elements 12–15 may be aluminium castings.

The frame structure has at its rear end, i.e. the end which faces towards the box, an outer contour which not all essentials corresponds to an inner contour of the chassis element 6. The front axle unit 11 can thus be inserted slightly into the box-like chassis element 6 and be connected to the latter by means of a number of bolt devices which extend through the chassis element 6 into the front axle unit 11. Such bolt devices are advantageously distributed along the whole periphery of the chassis element 65 so that the chassis element 6 and the front axle unit 11 are connected to one another along all the basic elements 12–15.

As further indicated in FIG. 3, the lower portion 12 has a platelike shape and a substantially greater extent in the direction of the longitudinal axis x than the upper portion 15 which rather has a beamlike shape. The two side portions 13 and 14 are narrower at the top in the direction of the longitudinal direction of the axis x, in the region where they are connected to the upper portion 15, than in the lower region where they are connected to the lower portion 12.

The vehicle 1 also incorporates an engine unit 20, depicted in FIGS. 2 and 3, which includes the vehicle's engine 21, the engine's radiator core 22 and two support members 23,24 on which the engine 21 and the radiator core 22 rest. The engine 21 is intended to be connected to the powered rear wheels 25 of the vehicle 1 via a gearbox (not depicted in the drawings) which is arranged in the box-like chassis element 6 in the vicinity of the rear wheels 25. The engine 21 and the radiator core 22 are mounted on the support members in such a way that the engine unit 20 can be moved as a unit without having to remove any engine components from the engine unit 20. The support members 23 and 24 extend substantially parallel with one another and with the longitudinal axis x when the engine unit 20 is fitted in the front axle unit 11, see FIG. 2. The engine unit 20 also incorporates two pillar members 26 and 27 which are connected to, and extend upwards, substantially vertically, from the support members 23 and 24. The upper ends of the pillar members 26 and 27 are connected to one another by means of an upper cross-member 28. The engine unit 20 also incorporates a lower cross-member 29 which extends between, and connects, the two support members 23 and 24.

The front axle unit 11 also incorporates two longitudinal members 31,32 which rest on the horizontal upper portion 15 and are intended to support the vehicle's cab 2. The vehicle's cab 2 thus rests on four support elements 33 respectively situated at each end of the two longitudinal members 31 and 32. With the object of further strengthening the front axle unit 11, particularly when the engine unit 20 is disassembled, sloping struts 35,36 are arranged between a lower part of the respective side portions 13,14 and a forward end of the respective longitudinal members 31,32. When the engine unit 11 is in its fitted state, it is situated at least partly in the central aperture or the space 10 in the front axle unit 11, and the two support members 23,24 rest on and are connected to the lower portion 12 of the front axle unit 11. When the engine unit 20 has to be disassembled from the vehicle, the connections between the support members 23 and 24 and between the pillar members 26,27 and the longitudinal members 31,32 are released. The engine unit 20 can then be drawn out of the front axle unit 11 by being pulled outwards in the direction of the longitudinal axis x. It should be particularly noted that such disassembly and extraction of the engine unit 20 can be performed without having to disassemble or tilt the driver's cab 2.

The front axle unit 11 also incorporates two wheels 40,41 which constitute the front wheels of the vehicle 1. FIGS. 2, 3 and 4 have the wheels 40,41 removed and depict instead the wheel hubs 42,43 on which the respective wheels 40,41 are intended to be fitted. The wheel hubs 42,43 incorporate in a conventional manner brake discs, brake pads and other equipment for the vehicle's braking. These components will not be referred to in more detail in this application. For the sake of simplicity, the wheels 40,41 will hereinafter denote complete wheel units each including a wheel, a wheel hub, a brake disc, brake pads etc. Each wheel 40,41 is individually suspended in the frame structure of the front axle unit 11. Each individual wheel suspension incorporates a lower link arm 44,45 and an upper link arm 46,47. The upper link arms 46,47 are each pivotingly connected to a respective side portion 13,14 and to a respective wheel 40,41. The lower link arms 44,45 are pivotingly connected to the lower portion 12 and to a respective wheel 40,41. Each wheel suspension also incorporates a spring device 48,49 which is connected to a respective end of the upper portion 15 and a respective lower link arm 44,45. Each spring device 48,49 incorporates a spring function and a shock-absorber function. The wheels 40,41 are thus entirely individually suspended, which means that road surface unevenness with respect to one wheel 40,41 results only in a movement of the particular wheel 40,41 and not of the other wheel 41,40. The vertical forces arising from such unevenness will be absorbed by the frame structure of the front axle unit 11.

The front axle unit 11 also incorporates a set of steering gear 51 which makes it possible via a linkage arrangement to steer the two wheels 40,41.

The invention is not limited to the example depicted but may be varied and modified within the scopes of the patent claims below.

What is claimed is:

1. A vehicle comprising:
    a front axle unit for the vehicle;
    a plurality of wheels disposed for supporting the vehicle, and including wheels at the front axle unit;
    an engine unit including an engine on the engine unit and operable for propelling the vehicle;
    the vehicle having a longitudinal direction vehicle axis, a longitudinal box-like chassis element extending along the vehicle axis;
    the front axle unit including a frame having a box-like structure in a cross-section across perpendicular to the vehicle axis;
    two of the vehicle wheels being suspended in the frame;
    the frame and the chassis element being separably connected; and
    the frame and the engine unit also being separably connected and the engine unit being supported on the frame.

2. The vehicle of claim 1, wherein the engine unit is supported on the front axle unit in a manner such that the engine unit may be installed in and may be at least partially extracted from the front axle unit.

3. The vehicle of claim 2, wherein the frame has a central aperture that is open in the direction of the vehicle axis.

4. The vehicle of claim 3, wherein the frame is shaped to define a substantially closed ring around the central aperture.

5. The vehicle of claim 4, wherein the closed ring of the frame has a substantially quadrilateral shape.

6. The vehicle of claim 5, wherein the chassis element has a substantially quadrilateral shape in a cross-section across the vehicle axis and the chassis element has an inner contour along the direction of the vehicle axis;
    the frame has an outer contour that corresponds to the inner contour of the chassis element and the frame outer contour is received in the inner contour of the chassis element.

7. The vehicle of claim 4, wherein the chassis element has an inner contour along the direction of the axis;
    the frame has an outer contour that corresponds to the inner contour of the chassis element and the frame outer contour is received in the inner contour of the chassis element.

8. The vehicle of claim 4, wherein the frame includes a substantially horizontal lower portion.

9. The vehicle of claim 8, wherein the frame includes two separated side portions which extend upward from the lower portion of the frame and a top portion which extends between and connects the two side portions.

10. The vehicle of claim 1, wherein the two wheels are individually suspended in the frame.

11. The vehicle of claim 10, further comprising, for each of the wheels suspended in the frame, a respective upper link arm pivotally connected to the frame and a respective lower link arm pivotally connected to the frame below the upper link arm and the respective upper link arm and the respective lower link arm suspending the respective wheel in the frame.

12. The vehicle of claim 9, further comprising, for each of the wheels suspended in the frame, a respective upper link arm pivotally connected to the frame and a respective lower link arm pivotally connected to the frame below the upper link arm and the respective upper link arm and lower link arm suspending each of the two wheels in the frame;
    the lower link arms being pivotally connected with the lower portion of the frame.

13. The vehicle of claim 12, wherein each of the upper link arms is pivotally connected with the respective side portion of the frame.

14. The vehicle of claim 13, further comprising a spring for each of the wheels at the front axle unit, the spring being connected to the respective lower link arm for each of the wheels at the front axle unit and to the top portion of the frame.

15. The vehicle of claim 1, further comprising a vehicle cab supportable on the front axle unit.

16. The vehicle of claim 1, wherein the engine unit comprises a vehicle engine, an engine radiator core and two support members extending substantially parallel with the vehicle axis, the engine and the radiator core being mounted on the two support members; the radiator being disposed forward of the engine with respect to the vehicle longitudinal direction.

17. The vehicle of claim 16, wherein the frame has a shape that includes a lower portion, side portions upstanding from the lower portion and a top portion that extends across and joins the side portions;

the support members being shaped and positioned to be on the engine and to at least partially rest on the lower portion of the frame with the engine unit supported in the front axle unit;

the support members further supporting the engine and the radiator core when the engine and the radiator core are separated from the front axle unit.

18. The vehicle of claim 1, further comprising the vehicle including rear wheels which are driven, a gear box spaced from the engine unit and located at the rear wheels; a drive shaft from the engine to the gear box for driving the gear box and a connection from the gear box to the rear wheels for driving the rear wheels.

19. A vehicle comprising:

a front axle unit for the vehicle;

a plurality of wheels disposed for supporting the vehicle, and including wheels at the front axle unit;

an engine unit including an engine on the engine unit and operable for propelling the vehicle;

the vehicle having a longitudinal direction vehicle axis, a longitudinal box-like chassis element extending along the vehicle axis;

the front axle unit including a frame having a box-like structure in a cross-section perpendicular to the vehicle axis;

two of the vehicle wheels being suspended in the frame;

the frame and the chassis element being separably connected;

the frame and the engine unit also being separably connected and the engine unit being supported on the frame;

the engine unit is supported on the front axle unit in a manner such that the engine unit may be installed in and may be at least partially extracted from the front axle unit;

the frame has a central aperture that is open in the direction of the vehicle axis;

wherein the engine unit includes at least a portion thereof that extends through the central aperture of the frame.

* * * * *